US008638680B2

(12) United States Patent
Sen et al.

(10) Patent No.: US 8,638,680 B2
(45) Date of Patent: Jan. 28, 2014

(54) APPLYING POLICIES TO A SENSOR NETWORK (75) Inventors: Mainak Sen, Fremont, CA (US); Debojyoti Dutta, Santa Clara, CA (US); Nagarajan Duraisamy, San Jose, CA (US); Manoj Kumar Pandey, Milpitas, CA (US); Tarun Banka, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 285 days.

(21) Appl. No.: 12/847,995

(22) Filed: Jul. 30, 2010

(65) Prior Publication Data

US 2012/0026898 A1    Feb. 2, 2012

(51) Int. Cl.
*H04L 12/26*    (2006.01)

(52) U.S. Cl.
USPC ............ 370/252; 370/235; 370/319; 370/373

(58) Field of Classification Search
USPC ................... 370/252, 235, 319, 373
See application file for complete search history.

(56) References Cited

U.S. PATENT DOCUMENTS

| 2004/0028003 | A1* | 2/2004 | Diener et al. ................ 370/319 |
| 2005/0018608 | A1* | 1/2005 | Wetherall et al. ............ 370/235 |
| 2007/0070888 | A1 | 3/2007 | Raman et al. |
| 2010/0318641 | A1 | 12/2010 | Bullard et al. |

OTHER PUBLICATIONS

U.S. Appl. No. 12/847,963, filed Jul. 30, 2010.
U.S. Appl. No. 12/848,012, filed Jul. 30, 2010.
T. Banka, U.S. Appl. No. 12/847,963, Request for Continued Examination mailed Mar. 20, 2013.
M. K. Pandey, U.S. Appl. No. 12/848,012, Request for Continued Examination mailed Mar. 11, 2013.
RFC 4761—Virtual Private LAN Service (VPLS). Using BGP for Auto-Discovery and Signaling; http://tools.ietf.org/html/rfc4761; dated Jan. 2007; last retrieved Dec. 1, 2012 (28 pages), Jan. 2007.
T. Banka, U.S. Appl. No. 12/847,963, Non-final Office Action from U.S. Patent and Trademark Office dated Aug. 20, 2012.
T. Banka, U.S. Appl. No. 12/847,963, Response to Non-final Office Action mailed Nov. 20, 2012.
T. Banka, U.S. Appl. No. 12/847,963, Final Office Action from U.S. Patent and Trademark Office dated Dec. 20, 2012.
M. K. Pandey, U.S. Appl. No. 12/848,012, Non-Final Office Action from U.S. Patent and Trademark Office dated Aug. 14, 2012.
M. K. Pandey, U.S. Appl. No. 12/848,012, Response to Non-final Office Action mailed Nov. 12, 2012.
M. K. Pandey, U.S. Appl. No. 12/848,012, Final Office Action from U.S. Patent and Trademark Office dated Dec. 13, 2012.
Non-Final Office Action, U.S. Appl. No. 12/848,012, issued by the USPTO for Manoj Kumar Pandey et al., 18 pages, Sep. 11, 2013.
Notice of Allowance and Fee(s) Due, Application U.S. Appl. No. 12/847,963, issued by the USPTO for Tarun Banka et al., 9 pages, Sep. 16, 2013.

\* cited by examiner

*Primary Examiner* — Albert T Chou
(74) *Attorney, Agent, or Firm* — Baker Botts L.L.P.

(57) ABSTRACT

In one embodiment, a method includes receiving a summary of statistics concerning a sensor node in a sensor network that comprises a plurality of sensor nodes, the statistics having been generated based on one or more of sensor data from a sensor at the sensor node, communication to the sensor node from one or more other sensor nodes in the sensor network, or communication from the sensor node; analyzing the summary; and applying based on the analysis one or more predetermined polices to one or more of the sensor nodes or the sensor network.

27 Claims, 3 Drawing Sheets

APPLYING POLICIES TO A SENSOR NETWORK

TECHNICAL FIELD

This disclosure relates generally to sensor networks.

BACKGROUND

A sensor network may include distributed autonomous sensors. Uses of sensor networks include but are not limited to military applications, industrial process monitoring and control, machine health monitoring, environment and habitat monitoring, utility usage, healthcare applications, home automation, and traffic control. A node in a sensor network is typically equipped with one or more sensors, a communications interface, a controller, and an energy source (such as a battery). Sensor nodes may vary considerably in size, and their cost may be similarly variable. Size and cost constraints on sensor nodes result in corresponding constraints on resources such as energy, memory, computational speed and bandwidth.

DESCRIPTION OF EXAMPLE EMBODIMENTS

Overview

In one embodiment, a method includes receiving a summary of statistics concerning a sensor node in a sensor network that comprises a plurality of sensor nodes, the statistics having been generated based on one or more of sensor data from a sensor at the sensor node, communication to the sensor node from one or more other sensor nodes in the sensor network, or communication from the sensor node; analyzing the summary; and applying based on the analysis one or more predetermined polices to one or more of the sensor nodes or the sensor network.

DESCRIPTION

Figure 1:
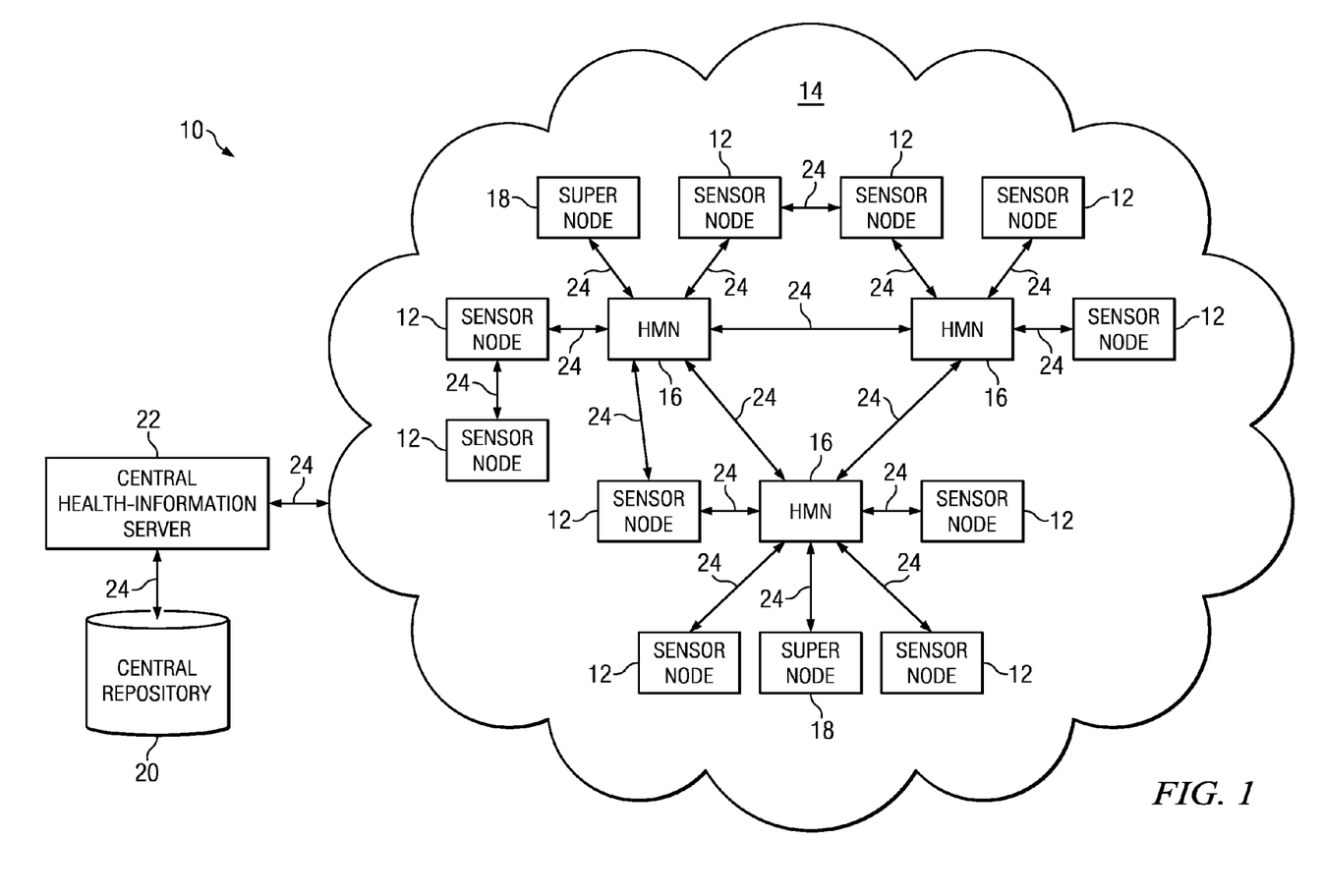
FIG. 1 illustrates an example system of sensor nodes in a network.

FIG. 1 illustrates an example system 10 of sensor nodes 12 in a network 14. As discussed below, sensor nodes 12 may be nodes in network 14 that include sensors. Network 14 may facilitate collecting, sharing, processing, presenting, archiving, and searching sensor or other data from sensor nodes 12. System 10 includes network 14 (which includes sensor nodes 12, HMNs 16, and super nodes 18), central repository 20, and central health-information server 22. Although FIG. 1 illustrates a particular number of sensor nodes, networks 14, HMNs 16, super nodes 18, central repositories 20, and central health-information servers 22, this disclosure contemplates any suitable number of sensor nodes 12, networks 14, HMNs 16, super nodes 18, central repositories 20, and central health-information servers 22. Moreover, although FIG. 1 illustrates a particular arrangement networks 14, HMNs 16, sensor nodes 12, super nodes 18, central repositories 20, and central health-information servers 22, this disclosure contemplates any suitable arrangement of sensor nodes 12, networks 14, HMNs 16, super nodes 18, central repositories 20, and central health-information servers 22. Network 14 may be a sensor network, and one or more portions of network 14 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or another network 14 or a combination of two or more such networks 14. Network 14 may include one or more networks 14. This disclosure contemplates any suitable network 14.

In network 14, links 24 couple HMNs 16, sensor nodes 12, and super nodes 18 to each other. In particular embodiments, links 24 also couple network 14 to central repository 18 and central health-information server 22. In particular embodiments, one or more links 24 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links. In particular embodiments, one or more links 24 each include an ad hoc network, an intranet, an extranet, a VPN, a LAN, a WLAN, a WAN, a WWAN, a MAN, a portion of the Internet, a portion of the PSTN, a cellular telephone network, or another link 24 or a combination of two or more such links 24. A link 24 may include one or more links 24. This disclosure contemplates any suitable links 24. Links 24 need not necessarily be the same throughout system 10. One or more first links 24 may differ in one or more respects from one or more second links 24. Although FIG. 1 illustrates particular connections among sensor nodes 12, HMNs 16, and super nodes 18 in network 14, this disclosure contemplates any suitable connections among sensor nodes 12, HMNs 16, and super nodes 18. Similarly, this disclosure contemplates any suitable connections among network 14, central repository 20, and central health-information server 22. As an example and not by way of limitation, in particular embodiments, every sensor node 12 may have (or at least attempt to establish) a connection to one and no more than one HMN 16. As another example, in particular embodiments, every sensor node 12 may have (or at least attempt to establish) a connection to every HMN 16 within a predetermined geographic distance of it. As another example, in particular embodiments, every sensor node 12 may have (or at least attempt to establish) a connection to every other sensor node 12 within a predetermined geographic distance of it. As another example, network 14 may include central repository 20 or central health-information server 22 (instead of having an external connection to them) and one or more links 24 may couple central repository 20 or central health-information server 22 to one or more sensor nodes 12, HMNs 16, or one or more super nodes 18.

In particular embodiments, sensor nodes 12 are nodes in network 14 that include sensors. In particular embodiments, a node is an electronic device that can send, receive, or forward information over a communication channel. A node may be active or passive and may be an endpoint or a redistribution point. A node may include one or more nodes and may be unitary or distributed. This disclosure contemplates any suitable nodes. In particular embodiments, a sensor is a device that can measure or otherwise sense one or more physical quantities and convert them into or generate based on them one or more signals that a human or other observer can read. Example physical quantities include but are not limited to chemical concentration, electrical fields, gravity, humidity, light, location, magnetic fields, motion, orientation, pressure, shear stress, sound, temperature, tension (or compression), torsion, and vibration. A signal may be a digital or analog electrical signal. Example sensors include but are not limited to an audio sensor, electricity meter, gas meter, Global Positioning System (GPS) locator, motion detector, potentiometer (which may, for example, operate as a fuel gauge), pressure sensor (which may, for example, operate as an altimeter, barometer, depth sensor, flow sensor, or leak sensor), still or video camera, thermometer, and water meter. A sensor may include one or more sensors and may be unitary or distributed. This disclosure contemplates any suitable sensors.

This disclosure contemplates any suitable sensor node 12. As an example and not by way of limitation, a sensor node 12 may be a smart meter at a residence that records information about the usage of one or more resources (such as electricity, gas, or water) at that residence and communicates that information to a utility company or other entity for billing, monitoring, or other purposes. Sensor node 12 may communicate that information to the utility company or other entity through one or more other sensor nodes 12, HMNs 16, or super nodes 18 in network 14, as discussed below. A sensor node 12 may include one or more sensors. Herein, reference to a sensor node 12 may encompass its sensors, where appropriate. Similarly, reference to a sensor may encompass its sensor node, where appropriate. A sensor node 12 and one or more of its sensors may be a single unitary device. In addition or as an alternative, a sensor node 12 and one or more of its sensors may be separate devices communicatively coupled to each other, for example, by one or more links 24. In particular embodiments, in addition to recording and communicating sensor data from its sensors, one or more sensor nodes 12 may receive and process commands or other instructions from one or more other sensor nodes 12, HMNs 16, super nodes 19, or central health-information server 22, as discussed below. Moreover, in particular embodiments, one or more sensor nodes 12 may generate commands or other instructions and communicate from one or more other sensor nodes 12, HMNs 16, super nodes 19, or central health-information server 22, as discussed below. In particular embodiments, one or more sensor nodes 12 may receive sensor or other data from other sensor nodes 12 and forward that data (possibly along with other information) to yet other sensor nodes 12, HMNs 16, super nodes 19, or central health-information server 22, as discussed below.

In particular embodiments, a sensor node 12 has one or more resources for carrying out its functions. These resources may include but are not limited to processing capabilities, memory, and power. A sensor node 12 may have one or more processors and one or memory devices. This disclosure contemplates sensor nodes 12 having any suitable number of any suitable processors and memory devices. A sensor node 12 may have an internal power source (such as, for example, one or more rechargeable or replaceable batteries) or receive power from an external power source (such as, for example, an electrical grid). A sensor node 12 may include one or more solar panels to provide power to it. This disclosure contemplates sensor nodes 12 having any suitable sources of power. Other resources of a sensor node 12 may but need not in all cases include software, such as, for example, application software, middleware, system software, firmware, and device drivers. This disclosure contemplates a sensor node 12 including any suitable resources for carrying out its functions.

All sensor nodes 12 in system 10 need not have the same resources; different sensor nodes 12 may have different resources. As an example and not by way of limitation, one or more first sensor nodes 12 may each have substantial processing capabilities, large amounts of memory, and almost unlimited power, while one or more second sensor nodes 12 may each have very limited processing capabilities, memory, and power. As another example, one or more first sensor nodes 12 may each have software running on them enabling them to perform a variety of functions (including higher-level ones), while one or more second sensor nodes 12 may each have less or scaled-down software running on them enabling them to perform fewer functions (or only lower-level ones). This disclosure contemplates any suitable diversity in the resources at sensor nodes 12 throughout system 10.

One or more sensor nodes 12 in system 10 may individually or collectively malfunction or otherwise function improperly. Similarly, one or more sensor nodes 12 in system 10 may individually or collectively be close to or at risk of malfunctioning or otherwise functioning improperly. As an example and not by way of limitation, a sensor node 12 may experience one or more impairments in its processing capabilities, memory, power, or other resources. As another example, a battery at a sensor node 12 may be low, putting sensor node 12 at risk of shutting down soon. As another example, a sensor node 12 may function improperly as a result of malware at sensor node 12, which may spread to one or more other sensor nodes 12 neighboring it. As another example, an event affecting an area (such as an earthquake or a fire) may render one or more sensor nodes 12 in that area partially or totally inoperative. As another example, a sensor node 12 may experience an unusually high volume of communication from other sensor nodes 12 to forward and, as a result, start dropping packets. As another example, a sensor node 12 may be a rogue node that has improperly joined network 14 with the intention of interfering with or taking improper advantage of one or more aspects of system 10. In particular embodiments, the "health" of a sensor node 12 represents its ability to function properly or to continue to function properly in system 10 or network 14. In addition or as an alternative, the health of a sensor node 12 may represent its capabilities (which may be based on its resources), independent of the proper functioning of sensor node 12. In particular embodiments, the health of a sensor node 12 may encompass the health of one or more other sensor nodes 12 neighboring it. There may be multiple aspects to the health of a sensor node 12. As an example and not by way of limitation, one or more aspects of the health of a sensor node 12 may be more node-specific, such as, for example, remaining power at sensor node 12. As another example, one or more aspects of the health of a sensor node 12 may be more network-specific, such as, for example, transmission (TX) errors committed or observed by sensor node 12, the size of a TX or receive (RX) queue at sensor node 12, or packet drops by sensor node 12. As another example, one or more aspects of the health of a sensor node 12 may concern the proper functioning of one or more sensors of sensor node 12. This disclosure contemplates the health of a sensor node 12 having any suitable number of any suitable aspects.

In particular embodiments, an HMN 16 is a node in network 14 that collects health statistics from a set of sensor nodes 12 (which may be a subset of all sensor nodes 12 in system 10). In particular embodiments, one or more HMNs 16 may police and take part in optimizing metrics of network 14. The set of sensor nodes 12 that an HMN 16 may collect health statistics from may, as an example and not by way of limitation, include sensor nodes 12 that are within a physical or logical neighborhood of HMN 16. An HMN 16 may include one or more computer systems (such as, for example, servers) and may be unitary or distributed. An HMN 16 may include one or more HMNs 16. HMNs 16 may provide an infrastructure for collecting data related to the health of sensor nodes 12 or network 14. In particular embodiments, each HMN 16 is responsible for collecting health statistics data from a set of sensor nodes 12 in its physical or logical neighborhood. There may be a particular set of data that is more important from the health prospective of network 14. Some data may be more node-specific such as (remaining energy) and other data may be more network-specific (such as, for example, TX errors, queue size, and packet drops). Each sensor node 12 may maintain these parameters and log it to its nearest HMN 16. Some data may be more application-specific. A sensor node 12 may periodically inform its HMN 16 about its health parameters or may update its HMN 16 only when deemed necessary. In particular embodiments, besides collecting health statistics, one or more HMNs 16 may detect or mitigate the risk of rogue nodes. They may also detect anomalies that could be introduced by external entities or malfunction of sensor nodes 12 or other nodes.

In particular embodiments, HMNs 16 are resource rich in comparison with sensor nodes 12. Each HMN 16 may be responsible for gathering health statistics for a subset of sensor nodes 12 in its geographical proximity. Each HMN 16 may maintain T seconds or minutes of data for each of its sensor nodes 12. In case data needs to be maintained for a longer duration for detailed analysis, then HMNs 16 may collaborate with their neighboring HMNs 16 to send health-monitoring information (which may include health statistics or other health data on sensor nodes 12, network 14, HMNs 16, or super nodes 18) to central repository 20. According to particular needs, HMNs 16 may use reliable or unreliable transfer protocols for transferring health data between each other or between an HMN 16 and a sensor node 12. In particular embodiments, in addition to being health-data collection repositories, HMNs 16 may provide conditional alarms when major or other anomalies are detected at one or more sensor nodes 12 or in network 14.

In particular embodiments, a sensor node 12 with enough resources may serve as an HMN 16. In particular embodiments, sensor nodes 12 may use discovery mechanisms among themselves to elect a new HMN 16 or to discover an existing HMN 16. In particular embodiments, there are provisions for the failure of an HMN 16. HMNs 16 may act as aggregators or brokers of information. As an example and not by way of limitation, an HMN 16 may aggregate health statistics from neighboring sensor nodes 12 and act as a broker for communicating that information from neighboring sensor nodes 12 outside network 14. HMNs can use aggregation and can act as brokers for passing the information from the sensors to entities outside network 14. In particular embodiments, super nodes 18 aggregate and analyze information from HMNs 16, sensor nodes 12, or both. A super node 18 may include one or more computer systems (such as, for example, servers) and may be unitary or distributed. A super node 18 may include one or more super nodes 18. Super nodes 18 may also have their own discovery, election, and failover mechanisms. An HMN 16 may peer with sensor nodes 12 and with other HMNs 16 that query it about health statistics. An HMN 16 may act as an aggregator or broker of information and network with peers or other devices querying it. In addition, HMNs 16 may also analyze data from sensor nodes 12 and learn about the environment. An HMN 16 may also acts as a proxy that pushes constraint information out to sensor nodes 12. As an example and not by way of limitation, in a temperature network of 100 sensor nodes 12, an HMN 16 may initially listen to all data for some time and then calculate an average expected value of various data, which HMN 16 may use to develop profiles for various constraints. In particular embodiments, one or more sensor nodes 12, HMNs, 16, or super nodes 18 may use Field Programmable Gate Arrays (FPGAs) to conserve power. In particular embodiments, a sensor node 12, HMN 16, or super node 18 may have a low-power hardware-accelerated implementation of an API using, for example, FGPAs or systems-on-chips (SoCs).

In particular embodiments, HMNs 16 may be standardized by one or more published Application Programming Interfaces (APIs). An HMN 16 may have one or more APIs for accessing health-monitoring data (which may include health statistics or other health data on sensor nodes 12, network 14, HMNs 16, or super nodes 18). As an example and not by way of limitation, an HMN 16 may have the following APIs to query or set health information when required:

```
get_data (sensor_node_addr, paramter_type)
set_data (sensor_node_addr, parameter type, data,
  time_stamp)
```

In particular embodiments, network 14 may be probed periodically for health statistics. To do this, a query may be routed from a network administrator to one or more HMNs 16 responsible for gathering health statistics from sensor nodes 12. Sensor nodes 12 may report their health statistics to HMNs 16, and HMNs 16 may collect and analyze these health statistics. This data may be used to predict the future health or estimate an amount of time that network 14 will continue to function at its current level. Health statistics may depend on network 14 and its usage model. Two different networks 14 may have different statistics and yet both be "healthy." In particular embodiments, an application may generate experimental traffic between selected pairs of senders/receivers and use this data to estimate "healthy" statistics for a given network 14.

As discussed above, one or more HMNs 16 may process and take action based on available data. Such HMNs 16 may operate as police nodes, keeping track of statistical profiles, which may include spatial and temporal correlation profiles. In particular embodiments, HMNs 16 may participate in a special overlay that may be used for distributed anomaly detection. In particular embodiments, there is a private overlay of police nodes. These police nodes may use multiple statistics classifiers to determine faulty sensors or sensor nodes 12. In particular embodiments, police nodes (which may be centralized or distributed) may monitor the health of network 14 and proactively act on the health data based on policy. In particular embodiments, classifiers may use pattern-recognition methods, tuned to this purpose. The police nodes may build multiple profiles for overall sensor-network health and use network-health profiles to characterize current health. In addition, particular embodiments may use these profiles to set off alarms based on classification results. A police node may detect the health of individual sensors or sensor nodes 12. To do this, the police node may compare a sensor's readings with those of its neighbors or use a spatial correlation function to determine whether the sensor's readings are likely to be false. This computation may be done by a zone leader or police node. In particular embodiments, police nodes may be elected using distributed leader election algorithms and weight may be given to nodes (which may in particular embodiments be sensor nodes 12 or HMNs) with higher battery life and additional hardware or software capabilities. Herein, reference to an HMN 16 may encompass a police node, and vice versa, where appropriate. Similarly, reference to a super node 18 may encompass a police node, and vice versa, where appropriate. In particular embodiments, a super node 18 may be an HMN 16 with police-node functionality.

In particular embodiments, police nodes may have two functions: one for normal data collection and another for policing to collect information about nodes in network 14. Thus, a police node may operate in two modes. One of these may be a learning mode in which the police node acts as a sensor node 12 in network 14. The police node may use the information it collects in this mode to learn about its environment and possible constraints on data and sensors. The other mode may be a police mode. Once the police node has enough information about normal operating characteristics, the police node may switch from learning mode to police mode and use information from the learning mode (or from a super node 18) about the characteristics of normal operating conditions and uses that information to police a set of sensor nodes 12 in network 14. The switch from one mode to another may be automatic or manual, supervised or unsupervised, according to particular needs.

In particular embodiments, a police node may sense and store data using a schema into a multi-dimensional vector, which may provide a multi-dimensional time series. In addition, the police node may clean and summarize the time series for upstream consumption (using, for example, statistical primitives). As an example and not by way of limitation, particular embodiments may use one or more wavelet transforms, discrete cosine transforms, or other suitable techniques to compact sensor data, which may reduce data transmission and power usage in network 14. In particular embodiments, clean-up and summarization may be a form of or a part of data aggregation. As an example and not by way of limitation, a police node may obtain packet-loss statistics from ten downstream sensor nodes 12. The police node may choose to report the average to its upper zonal node instead of providing all individual numbers. The police node may also report these numbers as a time series. The police node may report these number every hour and every hour take an average of all the statistics it has received, stamp the current time, and report the two. Its upstream node (which may be a super node 18) may maintain the time series of these statistics by storing the timestamp and the average packet loss reported.

In particular embodiments, a police node may have meta events that use raw data or summary data. As an example, a police node may be pre-configured with one or more definitions of one or more events. As data comes in, the police node may determine whether an event has occurred based on one or more suitable classifiers or thresholds related to those definitions. A meta event may be a logical expression. In particular embodiments, a meta event is an event composed of several smaller events and the satisfaction of several constraints. As an example and not by way of limitation, "bad weather" may be a meta event triggered when humidity is greater than 90% and fog level exceeds a predetermined threshold. Each meta event may be a threshold or statistics-based classifier (which may use a Bayesian or other machine-learning technique). One or more parallel classifiers may be used to increase power efficiency and speed. In particular embodiments, a police node may have policies that dictate what action to when a classifier triggers. Example actions include but are not limited to proactive probing, determining faults, or sending notifications or alarms. In particular embodiments, a police node may detect rogue behavior based on model-based anomaly detection. A police node may know the parameters of the model from policies at the police node or learn and auto-tune it based on past behavior. In particular embodiments, police nodes may be organized according to a redundant topology using, for example, a peer-to-peer (P2P) chord-like scheme use this topology to disseminate important events or other information.

Particular embodiments may implement distributed policy-based policing. In some such embodiments, all nodes or a subset of all nodes in network 14 act as police nodes. There may be different classifiers at different police nodes, each with its own policy. As a result, different police nodes may be different "policers" for different dimensions of health-monitoring data. This may reduce problems associated with having a single or too few potential points of failure. This may also facilitate better distribution of load.

In particular embodiments, every node in network 14 may be a police node. If one of the nodes determines that a node is malicious, the nodes may use a voting scheme to determine whether that node is in fact malicious. This may provide a more distributed approach to health-monitoring policing.

Particular embodiments may facilitate identifying or locating critical nodes, e.g., sensor nodes 12 or other nodes that are running low on power, which may facilitate fixing those nodes. In some such embodiments, nodes in one or more portions of network 14 (which may include sensor nodes 12, HMNs 16, or super nodes 18) may be organized into one or more zones, each with a zonal hierarchy. Zonal routing hierarchies are typically more scalable than flat-routing schemes. In particular embodiments, a lightweight addressing scheme identifies each sensor node 12. For zonal-based approaches, there may be a field that has the following format:

|-----------uint------------|-------------ushort------------|
Zone Leader Address    Node address in the zone In particular embodiments, each zone leader may pick a random address for itself. A zone leader may be a sensor node 12, an HMN 16, or a super node 18, where appropriate. This disclosure contemplates any suitable zone leaders. Zone leaders may efficiently communicate with other zone leaders, and they may handle address collisions more efficiently. In each zone, the zone leader may assign a sequential or other address to each member, e.g., sensor nodes 12, HMNs 16, or super nodes 18 in the zone. Each zone may have a relatively small number of nodes, and sizeof (ushort) will in most cases suffice to provide addressing to all the nodes in a zone. In particular embodiments, monitoring the health of sensor nodes 12 or network 14 may be more scalable or efficient when a zonal (or geographical) approach is used for routing. In each zone, the zone leader may be the police node in that zone. This may be more efficient because nodes in a given zone may already spend considerable resources trying to elect the zone leader.

Particular embodiments facilitate the generation of a network topology for one or more portions of network 14 or the location of an affected sensor node 12 using GPS technology. As an example and not by way of limitation, a human or other carrier may carry a GPS-enabled device through one or more portions of network 14. The GPS-enabled device may look for the zone leader in the area. Given the address (zone_leader, address_in_zone) or any other suitable addressing scheme, the GPS-enabled device may locate the affected sensor node 12 and fix or replace it, according to particular needs. Particular embodiments may generate a distance-based topology of one or more portions of network 14 in this way, e.g., using GPS technology to get location coordinates and store them with the addresses of sensor nodes 12, HMNs 16, or super nodes 18). Particular embodiments may use this to facilitate troubleshooting network 14. In particular embodiments, an android or other robot may carry the GPS-enabled device by itself, operating in conditions that may be hostile to humans. In particular embodiments, the robot need not rely on GPS technology and may instead track its (x,y) movement with each "step" and recreate the entire topology of its "walk" by saving the number of steps taken from its walk and marking each sensor along the way. Particular embodiments may use a combination of chips to identify a sensor node 12 or person carrying it (in case of a participatory network) in combination with the credibility of the source built over a period of time. In particular embodiments, an operator of network 14 may use GPS or other technology to determine the physical topology of a sensor network. A police node may store this information as a privileged node and use it to direct an external agent to trace through the topology for repairing or otherwise attending to nodes in network 14.

Central health-information server 22 may process health data on sensor nodes 12, network 14, HMNs 16, or super nodes 18. Central health-information server 22 may partially or wholly provide one or more functions described herein as performed by HMNs 16 or super nodes 18. In addition or as an alternative, central health-information server 22 may include additional functionality beyond that described as provided by HMNs 16 or super nodes 18, as described elsewhere. Central health-information server 22 may include one or more computer systems (such as, for example, servers) and may be unitary or distributed, for example, across multiple data centers. Central health-information server 22 may include one or more central health-information servers 22. Central repository 20 may include one or more databases or other repositories for health or other data from or regarding sensor nodes 12, network 14, HMNs 16, super nodes 18, or central health-information server 22. Central repository 20 may be unitary or distributed, for example, across multiple data centers. Central repository 20 may include one or more central repositories 20. Central repository 20 may but need not be co-located in whole or in part with central health-information server 22.

Example constraints that may affect maintaining network performance and integrity include but are not limited to computational power at each node; the nature of the task for the node (e.g., monitoring temperature, pressure, or light); the node's energy source; and storage at the node available for storing or forwarding information. During monitoring, particular embodiments may also consider the type of network 14: private (non-participatory) or public networks (participatory).

In particular embodiments, health-monitoring data (which may include health statistics or other health data on sensor nodes 12, network 14, HMNs 16, or super nodes 18) stored in HMNs 16 for a node (which may be a sensor node 12, HMN 16, or super node 18) may have the following attributes:
  Sensor Node address
  Energy_remaining, Time_stamp
  Packet Received, Time_stamp
  Packet Generated, Time_stamp
  Packet Transmitted, Time_stamp
  Queue Size, Time Stamp
  Packet Drops, Time_Stamp
  Collisions, Time_stamp
  Number of Retransmissions, Time_stamp
  Neighbor Density, Time_stamp
Although this disclosure describes particular attributes of particular health-monitoring data, this disclosure contemplates any suitable attributes of any suitable health-monitoring data. As an example and not by way of limitation, first health-monitoring data on one or more first sensor nodes 12 may have less than all the attributes listed above, while second health-monitoring data on one or more second sensor nodes 12 may have all the attributes listed above and third health-monitoring data on one or more third sensor nodes 12 may have all the attributes listed above plus one or more additional attributes not listed above. In particular embodiments, once data is collected at HMNs 16, a routing or transport protocol may query HMNs 16 regarding one or more past states of a node to determine whether to select it as a next hop for transmission. In particular embodiments, historical information available at HMNs 16 may facilitate the operation of any suitable routing or other communication protocol.

Data collected by HMNs 16 may enable a rich set of tools for generating control signals to control the operations of sensor nodes 12, network 14, HMNS 16, or super nodes 18. In particular embodiments, a police node may include functionality for machine learning that focuses on how system 10 collects health data or what health data system 10 collects. Particular embodiments may use a machine-learning-based approach or a suitable rule-based approach to troubleshoot or let a routing or transport protocol make better decisions to improve the overall performance of network 14 or one or more applications running on network 14. Particular embodiments use machine-learning algorithms based on statistical modeling techniques (such as, for example, Bayesian statistics, decision trees, or nearest neighbors) to profile data from sensors nodes 12. Particular embodiments may use these instead of or in combination with other security techniques to rate the credibility of data in participatory networks. Particular embodiments may provide a framework for applying learning-based event detection using a statistical toolbox (which may contain a set of basic statistical functions (such as, for example, linear regression, correlation, standard deviation, and distance function)) or custom hardware implementations of the primitives. Hardware acceleration of these primitives may involve one or more co-processors that individually or collectively handle fundamental operations (such as, for example, matrix inversion, eigenvalue, and eigenvector) in hardware. Particular embodiments may employ techniques for statistical modeling that feature extraction from raw data, training of statistical-model parameters (for example, for linear or non-linear models), and classifying unknown data based on learned model parameters. One or more of these steps may be implemented in parallel using low-power hardware designs As an example and not by way of limitation, extraction may use one or more Digital Signal Processing (DSP) chips for transforming raw data, for example, by filtering or wavelet transforms. Particular embodiments may use multiple classifiers (such as, for example, decision trees implemented using AND-OR logic trees. In addition or as an alternative, particular embodiments may use programmable micro-coded custom hardware with functional blocks for DSP, cryptography, or other suitable functions. Such hardware may operate as a network processing unit (NPU) for specific types of sensor-data processing.

Particular embodiments may use raw data from sensors (such as for example, temperature readings) and data about network 14 and constraints (such as, for example, battery power going down at one or more nodes or one or more nodes being non-responsive or otherwise unreachable) to determine the health or integrity of one or more portions of network 14. In one example use case of health data, given data from all devices, central health-information server 22 may process that data and determine which nodes are in a critical state in terms of resources. For example, if the average battery life of network 14 (average of all battery lives) is 200 days and one node has a battery life of only 10 days, then that node may be in a critical state. Central health-information server 22 may communicate this information back to that node and request the critical node not to forward any data not originating at that node. This alert may allow other nearby nodes to use other forwarding nodes instead of the critical node.

In another example use case of health data, if a certain node or a certain set of nodes (which may make up a zone) are seeing a large amount of packet drops or packet retransmissions or interference, then those nodes may be marked as nodes that are least preferred for forwarding data. With these problems at those nodes, data transmission may take longer and, due to retransmissions, may waste power. In another example use case of health data, if nodes in network 14 are experiencing high queue sizes, then network 14 may implement a Transmission Control Protocol (TCP)-like protocol, with congestion control (instead of just blasting all data in network 14). In another example use case of health data, network 14 (or an operator of network 14) may determine an average delay per hop. As an example and not by way of limitation, when a receiver receives a packet, it may look at the total delay and the number of hops, then divide the total delay by the number of hops to get average delay. If network 14 is healthy, these delays should be small (approximately 4-10 milliseconds).

In another example use case of health data, network 14 (or an operator of network 14) may determine a network load on one or more portions of network 14. Given a network datarate of C, an average flow-rate of X, a total of N flows, and each flow using an average hop of NumHops, the total capacity used by all flows may be bounded as follows:

$$\left(N \times \frac{\lambda}{NumHops}\right) \le C$$

Given transmission data from various sensors and NumHops data from various receivers, this may be estimated. If network 14 is operating consistently under a high load, this may be a bad sign. For example, network 14 could be at risk of running out or power soon.

In another example use case of health data, network 14 (or an operator of network 14) may determine the health of a routing protocol. As an example and not by way of limitation, if topological information is available, then given a set of senders and receivers a shortest path (perhaps optimal) route may be calculated for each sender-receiver pair. If the NumHops stats indicates otherwise, then the routing may have an undesirable design. Another health metric may be used to examine the percentage of control packets out of total packets being sent. Control packets may include, for example, route discovery, route replies, and route repairs. For more ideal routing, the control packets may be a small fraction (such as for example 25% to 40%). A large value may be an indication of bad health in one or more portions of network 14.

In another example use case of health data, network 14 (or an operator of network 14) may monitor for rogue behavior (or security-based abnormal behavior) in system 10. As an example and not by way of limitation, a sensor node 12 may behave abnormally in terms of forwarding data. There may be a node (or a set of nodes) that do not forward packets generated by others and these nodes may be healthy enough to do that. Looking at the topology of the network and at forwarding metrics (nodes can report data forwarded), a sensor gateway or controller may conclude that one of the nodes (or a set of nodes) have not been properly forwarding data.

Particular embodiments may provide a standardized framework for the exchanges of sensor data. As an example and not by way of limitation, nodes in network 14 may communicate sensor data using Extensible Markup Language (XML). Standardization may facilitate the interoperability among sensor nodes 12, HMNs 16, super nodes 16, central repository 20, and central health-information server 22. Particular embodiments may involve the communication of a large amount of health data, and it may be important to communicate this health data in an efficient manner. Using promiscuous listening and implicit health-related data forwarding, nodes in network 14 may not need to send explicit messages for reporting their health. Health options may be defined in the header format of transport or routing protocols, and nodes may report their health using these options. These options may be identified by a Type and may represent various health-related information, like battery power left, IP queue size, and packet drops, for example. Other nodes (which may listen to transmissions from neighboring nodes) may simply snoop and, if they find any health-related data, then they may store it in a neighbor table. This may be particular useful in zonal approaches, where the zone leader may store health information about its zone nodes. The zone leader may periodically forward this health-related information to central health-information server 22 for further processing.

As discussed Particular embodiments may proactively sense network 14 for issues or problems. Particular embodiments may help sensor-networks distributors to proactively monitor their sensor networks. Particular embodiments may facilitate the detection of anomalies in sensor networks. In particular embodiments, policy-based sensor-network management may increase the efficiency of management of the sensor network. Particular embodiments may facilitate policy propagation, monitoring, and sensing throughout sensor networks. Particular embodiments may serve as a policy database (distributed database), make policy decisions, and take action on those decisions. Particular embodiments may facilitate monitoring the health of a sensor network and estimating when it may become partitioned. Particular embodiments may facilitate the detection of rogue behavior in data transfer and data forwarding in a sensor network. Particular embodiments may provide more efficient approaches of communicating health data within or among sensor networks.

Figure 2:
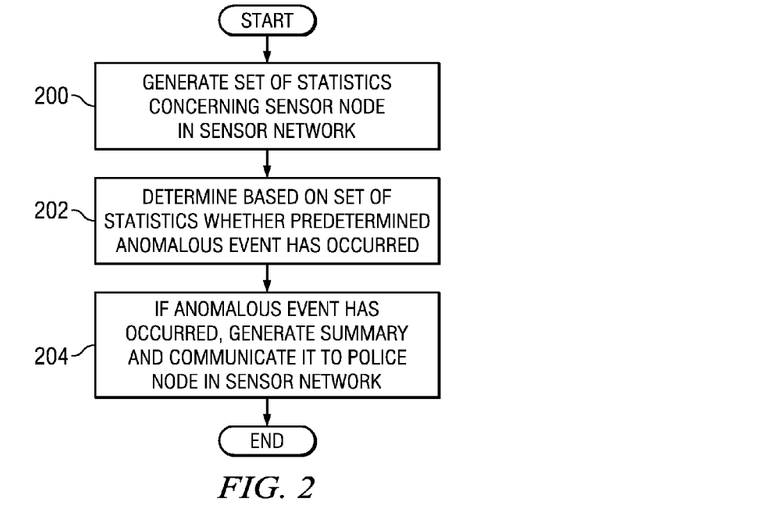
FIG. 2 illustrates an example method for reporting statistics on the health of a sensor node in a sensor network.

FIG. 2 illustrates an example method for reporting statistics on the health of a sensor node 12 in a sensor network. The method begins at step 200, where a sensor node 12, health-monitoring node 14, or super node 18 generates a set of statistics concerning sensor node 12, as described above. At step 202, sensor node 12, health-monitoring node 14, or super node 18 determines, based on a subset of the statistics, whether a predetermined anomalous event correlated with the subset has occurred, as described above. At step 204, sensor node 12, health-monitoring node 14, or super node 18 generates a summary of the subset and communicates it to a police node in sensor network 14, as described above, at which point the method ends. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components carrying out particular steps of the method of FIG. 2, this disclosure contemplates any suitable combination of any suitable components carrying out any suitable steps of the method of FIG. 2.

Figure 3:
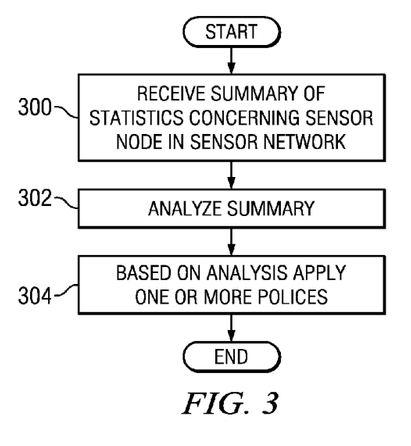
FIG. 3 illustrates an example method for formatting messages from sensor nodes in a sensor network.

FIG. 3 illustrates an example method for formatting messages from sensor nodes 12 in a sensor network. The method starts at step 300, where a health-monitoring node 14 or super node 18 receives a summary of statistics concerning a sensor node 12 in network 14, as described above. At step 302, health-monitoring node 14 or super node 18 analyzes the summary, as described above. At step 304, health-monitoring node 14 or super node 18 applies, based on the analysis, one or more predetermined polices to one or more sensor nodes 12 in network 14, at which point the method ends. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Figure 4:
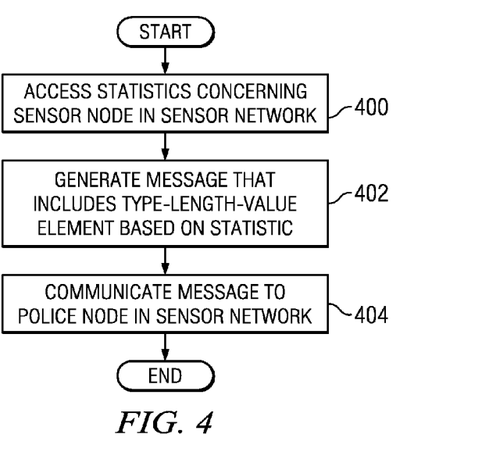
FIG. 4 illustrates an example applying policies to a sensor network.

FIG. 4 illustrates an example applying policies to a sensor network. The method starts at step 400, where sensor node 12, health-monitoring node 14, or super node 18 accesses a statistic concerning sensor node 12, as described above. At step 402, sensor node 12, health-monitoring node 14, or super node 18 generates a message that includes a type-length-value (TLV) element based on the statistic. The TLV element may include a first portion that indicates a class of the statistic, a second portion that indicates a numerical value for the statistic, and a third portion that indicates a length of the second portion. At step 404, sensor node 12, health-monitoring node 14, or super node 18 communicates the message to a police node in network 14, at which point the method ends. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

Figure 5:
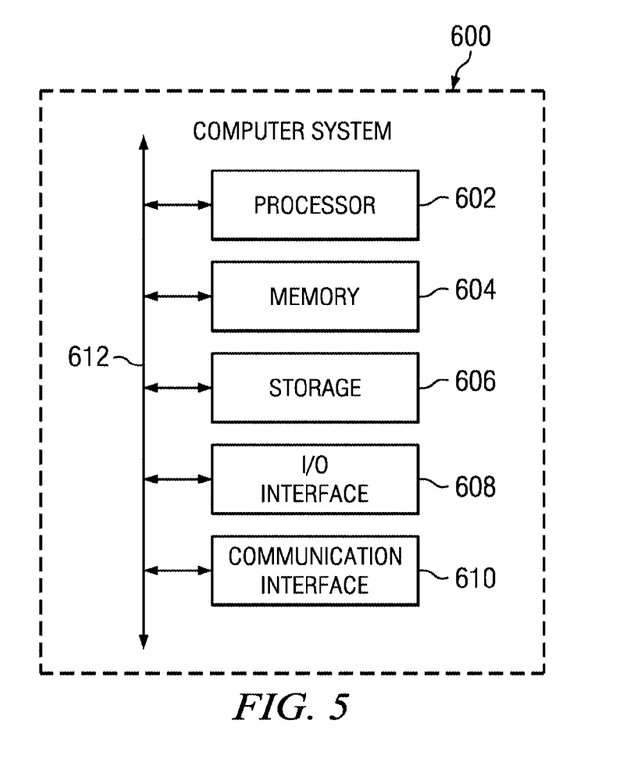
FIG. 5 illustrates an example computer system.

FIG. 5 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (e.g., another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (e.g., packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more tangible computer-readable storage media possessing structure. As an example and not by way of limitation, a computer-readable storage medium may include a semiconductor-based or other integrated circuit (IC) (such, as for example, an FPGA or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (e.g., one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving, at a node implemented by one or more computing devices and configured to switch between a data-sensing mode and a police mode, a summary of statistics indicative of health of a sensor node in a sensor network that comprises a plurality of sensor nodes, the statistics having been generated based on one or more of:
sensor data from a sensor at the sensor node;
communication to the sensor node from one or more other sensor nodes in the sensor network; or
communication from the sensor node;
analyzing the summary; and
applying based on the analysis one or more predetermined polices to one or more of the sensor nodes or the sensor network.

2. The method of claim 1, executed at a super node in the sensor network.

3. The method of claim 1, executed at a police node in the sensor network.

4. The method of claim 3, wherein the police node is a health-monitoring node or a super node in the sensor network.

5. The method of claim 1, wherein one of the predetermined policies comprises a transport policy.

6. The method of claim 1, wherein one of the predetermined policies comprises a security policy.

7. The method of claim 1, wherein one of the predetermined policies comprises a routing policy.

8. The method of claim 7, wherein, according to the routing policy, if a first network route in the sensor network is experiencing an occurrence of retransmissions that exceeds a predetermined threshold, one or more of the sensor nodes use one or more other network routes in sensor network for communication.

9. The method of claim 1, wherein the statistics comprise one or more of:
a logical or physical address of the sensor node;
an amount of energy remaining at the sensor node;
a number of packets communicated to the sensor node from the other sensor nodes over a recent period of time;
a number of packets generated at the sensor node over the recent period of time;
a number of packets communicated from the sensor node over the recent period of time;
a size of a queue at the sensor node;
a number of packet drops at the sensor node over the recent period of time; or
a number of packet collisions observed by the sensor node over the recent period of time.

10. One or more computer-readable non-transitory storage media embodying instructions that are operable when executed to:
sense data indicative of operating characteristics of a sensor network that comprises a plurality of sensor nodes;
switch from a data-sensing mode to a police mode;
receive a summary of statistics concerning a sensor node in the sensor network, the statistics having been generated based on one or more of:
sensor data from a sensor at the sensor node;
communication to the sensor node from one or more other sensor nodes in the sensor network; or
communication from the sensor node;
analyze the summary; and
apply based on the analysis one or more predetermined polices to one or more of the sensor nodes or the sensor network.

11. The media of claim 10, residing at a super node in the sensor network.

12. The media of claim 10, residing at a police node in the sensor network.

13. The media of claim 12, wherein the police node is a health-monitoring node or a super node in the sensor network.

14. The media of claim 10, wherein one of the predetermined policies comprises a transport policy.

15. The media of claim 10, wherein one of the predetermined policies comprises a security policy.

16. The media of claim 10, wherein one of the predetermined policies comprises a routing policy.

17. The media of claim 16, wherein, according to the routing policy, if a first network route in the sensor network is experiencing an occurrence of retransmissions that exceeds a predetermined threshold, one or more of the sensor nodes use one or more other network routes in sensor network for communication.

18. The media of claim 10, wherein the statistics comprise one or more of:
 a logical or physical address of the sensor node;
 an amount of energy remaining at the sensor node;
 a number of packets communicated to the sensor node from the other sensor nodes over a recent period of time;
 a number of packets generated at the sensor node over the recent period of time;
 a number of packets communicated from the sensor node over the recent period of time;
 a size of a queue at the sensor node;
 a number of packet drops at the sensor node over the recent period of time; or
 a number of packet collisions observed by the sensor node over the recent period of time.

19. An apparatus comprising:
 a communication interface;
 one or more processing devices; and
 one or more computer-readable non-transitory storage media embodying instructions that are operable when executed by the processing devices to:
  sense data indicative of operating characteristics of a sensor network that comprises a plurality of sensor nodes;
  switch from a data-sensing mode to a police mode;
  receive a summary of statistics indicative of health of a sensor node in the sensor network, the statistics having been generated based on one or more of:
   sensor data from a sensor at the sensor node;
   communication to the sensor node from one or more other sensor nodes in the sensor network; or
   communication from the sensor node;
  analyze the summary; and
  apply based on the analysis one or more predetermined polices to one or more of the sensor nodes or the sensor network.

20. The apparatus of claim 19, comprising a super node in the sensor network.

21. The apparatus of claim 19, comprising a police node in the sensor network.

22. The apparatus of claim 21, wherein the police node is a health-monitoring node or a super node in the sensor network.

23. The apparatus of claim 19, wherein one of the predetermined policies comprises a transport policy.

24. The apparatus of claim 19, wherein one of the predetermined policies comprises a security policy.

25. The apparatus of claim 19, wherein one of the predetermined policies comprises a routing policy.

26. The apparatus of claim 25, wherein, according to the routing policy, if a first network route in the sensor network is experiencing an occurrence of retransmissions that exceeds a predetermined threshold, one or more of the sensor nodes use one or more other network routes in sensor network for communication.

27. The apparatus of claim 19, wherein the statistics comprise one or more of:
 a logical or physical address of the sensor node;
 an amount of energy remaining at the sensor node;
 a number of packets communicated to the sensor node from the other sensor nodes over a recent period of time;
 a number of packets generated at the sensor node over the recent period of time;
 a number of packets communicated from the sensor node over the recent period of time;
 a size of a queue at the sensor node;
 a number of packet drops at the sensor node over the recent period of time; or
 a number of packet collisions observed by the sensor node over the recent period of time.

* * * * *